United States Patent Office
3,544,620
Patented Dec. 1, 1970

3,544,620
NOVEL PERFLUOROALKYL AND PERFLUORO-
ALKOXY THIO ACIDS
Everett E. Gilbert, Morris Township, Morris County,
and James O. Peterson, Convent Station, N.J., assignors
to Allied Chemical Corporation, New York, N.Y., a
corporation of New York
No Drawing. Filed Mar. 21, 1969, Ser. No. 809,369
Int. Cl. C07c 153/01
U.S. Cl. 260—502.6          5 Claims

ABSTRACT OF THE DISCLOSURE

Novel perfluoroalkyl and perfluoroalkoxy thio acids useful for imparting high lubricity surfaces to unsaturated elastomers by chemical grafting procedures.

This invention relates to long-chain perfluoroalkyl and perfluoroalkoxy thio acids and to use of the acids for imparting high lubricity surfaces to unsaturated elastomers by chemical grafting procedures.

Unsaturated elastomers are well known to have surfaces which possess a high coefficient of friction. In most major applications, as in automobile tires, shoe heels and V-belts, the frictional nature of the unsaturated elastomers provides desirable non-slip properties.

In some applications of the unsaturated elastomers, however, flexibility and resilience are the desired properties and a high coefficient of friction not only has no value but would be detrimental. In O-rings, valve packings, shaft bearings, gaskets, windshield wipers, hatch seals and weather stripping, the ability to conform to an opposing surface is essential, but friction contributes to wear and loss of performance. In order to produce unsaturated elastomers having a low coefficient of friction, it has been necessary to mix a lubricating material into the base composition. Polytetrafluoroethylene powder, graphite, molybdenum disulfide and oils added in sufficient amount to provide adequate lubrication of the unsaturated elastomers have caused loss of elasticity and strength. Further, only temporary reduction of friction has been obtained.

Prior art workers have, therefore, suggested reducing the coefficient of friction of elastomers by chemically grafting a lubricant to the surface of the elastomer. One known process involves (1) activation of the elastomer by radiation, (2) graft polymerization of acrylic acid to the elastomer surface to produce moieties of the structure —CH$_2$CH(COOH)— and (3) reaction with sulfur tetrafluoride to convert the carboxyl groups to trifluoromethyl groups. This process, however, has proved to be impractical since the sulfur tetrafluoride reagent is too expensive, and the introduction of trifluoromethyl groups is insufficient to effect substantial reduction of surface friction.

An object of the present invention is to provide novel long-chain perfluoroalkyl and perfluoroalkoxy thio acids.

A further object of the invention is to impart high lubricity surfaces to unsaturated elastomers by simple chemical grafting procedures using the perfluoroalkyl and perfluoroalkoxy thio acids.

Other objects and advantages will be apparent from the following description and examples.

The novel perfluoroalkyl and perfluoroalkoxy thio acids of the present invention have the following formula:

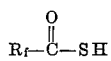

wherein $R_f$ is a perfluoroalkyl or perfluoroalkoxy group having at least 7 carbon atoms, preferably 7 to 12 carbon atoms. Among examples of the perfluoroalkyl and perfluoroalkoxy thio acids are perfluorothiooctanoic acid ($C_7F_{15}COSH$), 2,2,3,3,4,4,5,5,6,6-decafluoro - 6 - (heptafluoroisopropoxy) thiocaproic acid [$C_3F_7O(CF_2)_5COSH$], $C_{11}F_{23}COSH$ and $C_3F_7O(CF_2)_9COSH$.

The perfluoroalkyl and perfluoroalkoxy thio acids of this invention may be prepared by alternative procedures known in the art for producing other thio acids.

In one procedure for producing the perfluoroalkyl and perfluoroalkoxy thio acids, a perfluoroacid halide is reacted with hydrogen sulfide in an acid-acceptor solvent. The reaction occurring may be represented by the following equation:

wherein $R_f$ is as indicated above and X is a halogen. This procedure is carried out by reacting about 1 to 2 mols of hydrogen sulfide per mol of the perfluoroacid halide at temperature of about $-5°$ to $50°$ C. Suitable acid-acceptor solvents include tertiary nitrogen bases such as pyridine, the picolines, quinoline and triethylamine. Use of pyridine is shown in the above equation.

In a second procedure, a perfluoroacid halide is reacted with hydrogen sulfide in the presence of an aluminum trichloride or tribromide catalyst with or without a solvent. The reaction occurring may be represented by the following equation:

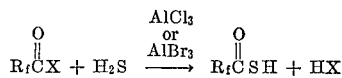

wherein $R_f$ is as indicated above and X is halogen. This procedure is carried out by reacting about 1 to 2 mols of hydrogen sulfide per mol of the perfluoroacid halide at temperature of about $-5°$ to $50°$ C. in the presence of an aluminum trichloride or tribromide catalyst. If desired, non-reactive solvents such as carbon disulfide, nitrobenzene and nitromethane may be employed.

In a third procedure, a perfluorocarboxylic acid is reacted with phosphorus pentasulfide, as described in J. Org. Chem. 25, 180 (1960). The reaction occurring may be represented by the following equation:

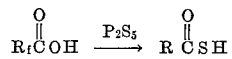

wherein $R_f$ is as indicated above.

Illustrative examples for preparation of the novel perfluoroalkyl and perfluoroalkoxy thio acids are set forth below. In the examples, parts are by weight.

EXAMPLE 1

442 parts of anhydrous pyridine cooled to about $-5°$ to $0°$ C. were saturated by bubbling hydrogen sulfide into the pyridine. 87 parts of perfluorooctanoyl chloride were added dropwise to the mixture over a period of about 1.5 hours, maintaining the mixture below $0°$ C. After this addition, additional hydrogen sulfide was bubbled into the mixture over a 3 hour period, maintaining the mixture below $0°$ C. The reaction mixture was then poured into cold ($<0°$ C.) dilute hydrochloric acid, and additional dilute hydrochloric acid was added until the pH of the mixture was about 1. The resulting aqueous mixture was extracted with diethyl ether. The ether extract was washed with saturated sodium chloride solution and finally dried with sodium sulfate powder. Evaporation of the diethyl ether, followed by vacuum distillation, gave 43 parts of perfluorothiooctanoic acid having a boiling point of 96–97° C./100 mm.

The structure of the product was verified by infrared analysis which showed the expected strong S—H absorption at 3.9 microns and carbonyl absorption at 5.8 microns.

EXAMPLE 2

43 parts of perfluorooctanoyl chloride were mixed with one part of anhydrous aluminum chloride at 0° C. Hydrogen sulfide was then bubbled into the mixture for 16 hours. After this period, the aluminum chloride was removed by filtration. Vacuum distillation of the product gave 26 parts of perfluorothiooctanoic acid having a boiling point of 96–98° C./100 mm.

EXAMPLE 3

40 parts of 2,2,3,3,4,4,5,5,6,6-decafluoro-6-(heptafluoroisopropoxy) caproyl chloride were mixed with one part anhydrous aluminum chloride at 0°. Hydrogen sulfide was bubbled into the mixture for 6 hours. After this period, the aluminum chloride was removed by filtration. Vacuum distillation of the mixture gave 5 parts of 2,2,3,3,4,4,5,5,6,6, - decafluoro-6-(heptafluoroisopropoxy) thiocaproic acid having a boiling point of 65° C./25 mm.

The structure of this product was verified by infrared analysis which showed the expected strong S—H absorption at 3.9 microns and carbonyl absorption at 5.8 microns The acid chloride $[C_3F_7O(CF_2)_5COCl]$ used as reactant may be prepared by refluxing the corresponding carboxylic acid $[C_3F_7O(CF_2)_5COOH]$ with thionyl chloride and separating the acid chloride from the reaction product by fractional distillation. The carboxylic acid, in turn, may be prepared by reacting $C_3F_7O(CF_2)_6I$ with chlorosulfonic acid at temperature of about 115–125° C., hydrolyzing the reaction product and separating the carboxylic acid from the hydrolyzed product by fractional distillation.

As indicated above, the novel perfluoroalkyl and perfluoroalkoxy thio acids of this invention can be used to impart high lubricity surfaces to unsaturated elastomers by chemical grafting procedures. The unsaturated elastomers include natural rubber, polydienoid rubbers such as polybutadiene rubber, polyisoprene rubber, polybutadiene-styrene rubber and the like.

Suitable procedures for chemical grafting of the perfluoroalkyl and perfluoroalkoxy thio acids to the unsaturated elastomers involve the use of ultraviolet light or free radical catalysis.

During the chemical grafting procedures, the perfluoroalkyl or perfluoroalkoxy thio acid reacts with the double bonds in the elastomer to form thio esters, as set forth below:

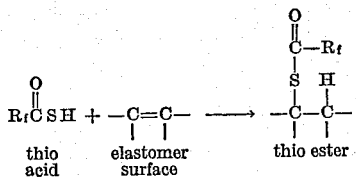

```
                                 O
                                 ||
                                 C—Rf
                                 |
        O                        S  H
        ||                       |  |
    RfCSH  +  —C=C—    ——→    —C—C—
              |  |                |  |
    thio    elastomer          thio ester
    acid    surface
``` wherein $R_f$ is a perfluoroalkyl or perfluoroalkoxy group having at least 7 carbon atoms, preferably 7 to 12 carbon atoms.

In the ultraviolet light procedure, the elastomer is soaked in the perfluoroalkyl or perfluoroalkoxy thio acid and then irradiated, for example, with a mercury vapor lamp in an inert, oxygen-free atmosphere such as nitrogen or argon, for a suitable period of time. It has been found that irradiation for a period of about 1 hour is adequate to effect chemical grafting of the thio acid to the surface of the elastomer.

In the free radical catalysis procedure, the elastomer is placed in a suitable organic solvent, for example an ether such as dioxane, or a chlorinated hydrocarbon such as carbon tetrachloride or chloroform, containing the perfluoroalkyl or perfluoroalkoxy thio acid and a free radical catalyst, for example a peroxide such as benzoyl peroxide, at a temperature of about 20° to 150° C. for a suitable period of time. A period of about 3 hours has been found to be adequate for chemical grafting of the thio acid to the elastomer surface.

The production of elastomers having high lubricity surfaces is illustrated in the examples set forth below.

EXAMPLE 4

Strips (1" x 3" x 0.033") of natural rubber, commonly referred to as dental dam, were soaked in perfluorothiooctanoic acid for one hour and then irradiated with a mercury arc lamp in a nitrogen atmosphere for one hour on each side. The rubber surface was thoroughly washed with acetone and then with an aqueous soap solution. Examination of the rubber surface by attenuated total reflectance infrared spectroscopy showed that the perfluorothio groups were still present and a chemical reaction to form the corresponding thio ester had occurred. Further, elemental analysis showed that the treated rubber contained 15% fluorine whereas the untreated rubber contained no fluorine.

EXAMPLE 5

Slabs (1" x 3" x 0.075") of polyisoprene rubber and polybutadiene rubber, prepared in accordance with ASTM–D15–66T, were soaked in 2,2,3,3,4,4,5,5,6,6-decafluoro-6-(heptafluoroisopropoxy) thiocaproic acid for 15 minutes. The slabs were then irradiated with a mercury arc lamp in a nitrogen atmosphere for 30 minutes on each side to effect chemical reaction to form the corresponding thio ester.

EXAMPLE 6

Slabs (1" x 3" x 0.075") of polyisoprene rubber and polybutadiene rubber, prepared in accordance with ASTM–D15–66T, were placed in 25 ml. of a dioxane solution containing 0.1 gram of benzoyl peroxide and 5 ml. of perfluorothiooctanoic acid. The slabs were then heated at 100° C. for 3 hours to effect chemical reaction to form the corresponding thio ester.

The above treated rubbers and like rubbers treated in similar manner with trichlorothioacetic acid ($CCl_3COSH$) and perfluorothiobutyric acid ($C_3F_7COSH$) were tested for reduction of surface friction on the Bell Laboratories frictionometer, as described by R. F. Westover and W. I. Vroom, SPE Journal, October 1963, pages 1093–9. The data given below were obtained at "high speed" and at "low speed." The lower the figure compared with the blank, the greater the reduction in friction.

| Thio acid | Coefficient of friction | | | |
|---|---|---|---|---|
| | Polybutadiene rubber | | Polyisoprene rubber | |
| | HS [a] | HF [b] | HS [a] | HF [b] |
| Blank | 1.28 | 1.22 | 0.64 | 0.52 |
| $CCl_3COSH$—known material | (c) | (c) | (c) | (c) |
| $C_3F_7COSH$—known material | (d) | (d) | (d) | (d) |
| $C_7F_{15}COSH$—Example 4 | 1.02 | 0.66 | 0.46 | 0.40 |
| $C_7F_{15}COSH$—Example 6 | 0.86 | 0.64 | -------- | 0.38 |
| $C_3F_7O(CF_2)_5COSH$—Example 5 | 1.00 | 0.90 | 0.58 | 0.50 |

[a] Slow speed coefficient of friction (30–50 cm./sec.).
[b] Fast speed coefficient of friction (300–500 cm./sec.).
[c] Made the rubber surface hard—developed cracks.
[d] Made the rubber surface hard—developed cracks.

The effect of the present long-chain perfluoroalkyl and perfluoroalkoxy thio acids in imparting high lubricity surfaces to unsaturated elastomers was quite surprising since the related materials, trichlorothioacetic acid and perfluorothiobutyric acid, failed to give this desired result.

The high lubricity of the treated elastomer surfaces was demonstrated qualitatively in another manner. Equally sized slabs of untreated polyisoprene and polybutadiene rubbers and of polyisoprene and polybutadiene rubbers treated with 2,2,3,3,4,4,5,5,6,6-decafluoro-6-(heptafluoroisopropoxy) thiocaproic acid were placed at the top of a horizontal plane surface. The surface was then inclined until the slabs started to slide. The treated slabs started sliding first and at an angle 10–20° less than that at which the untreated slabs started to slide.

We claim:

1. Perfluoroalkyl and perfluoroalkoxy thio acids having the formula:

wherein $R_f$ is a perfluoroalkyl or perfluoroalkoxy group having at least 7 carbon atoms.

2. Perfluoroalkyl thio acids of claim 1 wherein $R_f$ is a perfluoroalkyl group having 7 to 12 carbon atoms.

3. Perfluoroalkoxy thio acids of claim 1 wherein $R_f$ is a perfluoroalkoxy group having 7 to 12 carbon atoms.

4. Perfluorothiooctanoic acid.

5. 2,2,3,3,4,4,5,5,6,6, - decafluoro - 6 - (heptafluoroisopropoxy) thiocaproic acid.

References Cited

FOREIGN PATENTS 145,566   3/1961   Russia.

DANIEL D. HORWITZ, Primary Examiner

U.S. Cl. X.R.

260—768, 94.7; 204—159.2